United States Patent
Sisolak et al.

(10) Patent No.: US 7,818,603 B2
(45) Date of Patent: Oct. 19, 2010

(54) DERIVING ACCURATE MEDIA POSITION INFORMATION

(75) Inventors: Daniel D. J. Sisolak, Issaquah, WA (US); Kenneth H. Cooper, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 848 days.

(21) Appl. No.: 11/729,224

(22) Filed: Mar. 28, 2007

(65) Prior Publication Data

US 2008/0244304 A1    Oct. 2, 2008

(51) Int. Cl.
  *G06F 1/04*    (2006.01)
  *G06F 1/12*    (2006.01)
  *G06F 1/14*    (2006.01)

(52) U.S. Cl. ............ 713/600; 713/601; 713/500; 713/501; 713/502; 713/503; 375/354; 375/355; 375/360

(58) Field of Classification Search ............ 713/600, 713/601, 500, 501, 502, 503; 375/354, 355, 375/360
See application file for complete search history.

(56) References Cited

U.S. PATENT DOCUMENTS

| | | | |
|---|---|---|---|
| 6,226,701 B1 * | 5/2001 | Chambers et al. ......... 710/105 |
| 6,310,895 B1 | 10/2001 | Lundh et al. |
| 6,775,724 B2 | 8/2004 | Toshitani et al. |
| 6,795,515 B1 * | 9/2004 | Riedle et al. ............. 375/355 |
| 6,882,296 B2 * | 4/2005 | Knott ....................... 341/160 |
| 7,093,151 B1 | 8/2006 | Williams |
| 7,120,216 B2 | 10/2006 | Shirota et al. |
| 7,120,259 B1 | 10/2006 | Ballantyne et al. |
| 7,120,813 B2 | 10/2006 | Leydier et al. |
| 7,545,848 B2 * | 6/2009 | Haeffele ..................... 375/145 |
| 2003/0236932 A1 | 12/2003 | Saito et al. |
| 2006/0064521 A1 | 3/2006 | Lin |
| 2006/0064522 A1 | 3/2006 | Weigold et al. |
| 2006/0166627 A1 | 7/2006 | Crawley |

FOREIGN PATENT DOCUMENTS

WO    WO9925097 A1    5/1999

OTHER PUBLICATIONS

"Audio Interfaces Audio Interfaces and Clocks", http://www.westlamusic.com/pdfs/019.pdf.

* cited by examiner

*Primary Examiner*—Thomas Lee
*Assistant Examiner*—Michael J Brown

(57) ABSTRACT

Various embodiments utilize different counters or clocks, working in concert, to smooth out position information that is derived for a rendering/capturing device. Specifically, in at least some embodiments, each counter or clock has a different speed. A faster counter or clock is used to determine intra-transition position offsets relative to a slower counter or clock.

20 Claims, 4 Drawing Sheets

DERIVING ACCURATE MEDIA POSITION INFORMATION

BACKGROUND

When a streaming multimedia rendering/capturing device (such as an audio device) renders or captures data, it can be important for processing purposes, to know which data in the stream the device's hardware is currently rendering or capturing. Information that describes which data is currently being rendered or captured is typically referred to as position information usually dealing with an offset into the stream. Having accurate position information can greatly facilitate operations that are performed on data such as acoustic echo cancellation operation, synchronization operations (such as synchronizing audio data with video data) and the like.

One type of audio rendering/capturing device is a Universal Serial Bus (USB) audio device. In USB audio devices, the clock source used to determine the current position of audio data being processed by the device is the USB Start of Frame (SOF) counter. The USB SOF counter works at a granularity of one millisecond. Specifically, by design the USB bus uses one millisecond frames to process audio data. Thus, the USB SOF counter works in one millisecond increments. Many times, however, this counter is not very reliable which can lead to errors in position information that is derived from SOF counter measurements.

In addition, many applications that require precise position information cannot be employed reliably at the granularity of one millisecond. For example, using the USB SOF counter to derive position information, and relating that information to other data clocks, can cause "jumps" in the position information which makes it difficult, if not impossible, for applications such as acoustic echo cancellation to follow the trending of the information and perform its function. Specifically, in audio systems in which there is a USB Audio device, an audio pump running on its own clock period is used to process audio data through the system. The USB audio device driver derives position information from the SOF counter's one millisecond boundaries and passes that information to the audio engine for use. If the audio pump's clock is slightly off from the SOF counter's clock, it is possible for a boundary to be missed, thus resulting in a jump in the position data that is ultimately derived.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments utilize different counters or clocks, working in concert, to smooth out position information that is derived for a rendering/capturing multimedia device. Specifically, in at least some embodiments, each counter or clock has a different speed. A faster counter or clock is used to determine intra-transition position offsets relative to a slower counter or clock.

In at least one embodiment, a system performance counter is used as a faster clock to compute intra-transition position offsets relative to a USB SOF counter for a USB audio device.

BRIEF DESCRIPTION OF THE DRAWINGS

The same numbers are used throughout the drawings to reference like features.

DETAILED DESCRIPTION

Overview

Various embodiments utilize different counters or clocks, working in concert, to smooth out position information that is derived for a streaming rendering/capturing device. Specifically, in at least some embodiments, each counter or clock has a different speed. A faster counter or clock is used to determine intra-transition position offsets relative to a slower counter or clock.

In at least one embodiment, a system performance counter is used as a faster clock to compute intra-transition position offsets relative to a USB SOF counter for a USB audio device.

In the discussion that follows, a section entitled "Deriving Time Values using a Faster Clock" is provided and discusses, generally, the notion of using a first faster clock to compute accurate time values relative to a second less accurate clock. Following this, a section entitled "Implementation Example" is provided and describes how, in one embodiment, the principles described in the preceding section can be applied in the context of a USB audio device to derive accurate position information. Following this, a section entitled "Example System" is provided and generally describes a computing device whose components can be used to implement the methodologies described herein.

Deriving Time Values Using a Faster Clock

In one or more embodiments, a first faster clock is used to look for a single transition or increment in a second slower clock. When that transition or increment is found, the transition is timestamped using the first faster clock. Then, the first faster clock is used to look for another transition or increment in the second slower clock. Once this second transition is found, it is timestamped using the first faster clock. These two timestamped transitions define a line which represents a more accurate measure of time between the transitions than if the first faster clock were not used. By knowing the time between the transitions and the number of transitions, an average is computed and represents the average time between transitions. This average, known as the period of the second clock, can then be used to accurately extrapolate position information based on the current time as represented by the second slower clock and the amount of time since the second timestamped transition occurred.

Figure 1:
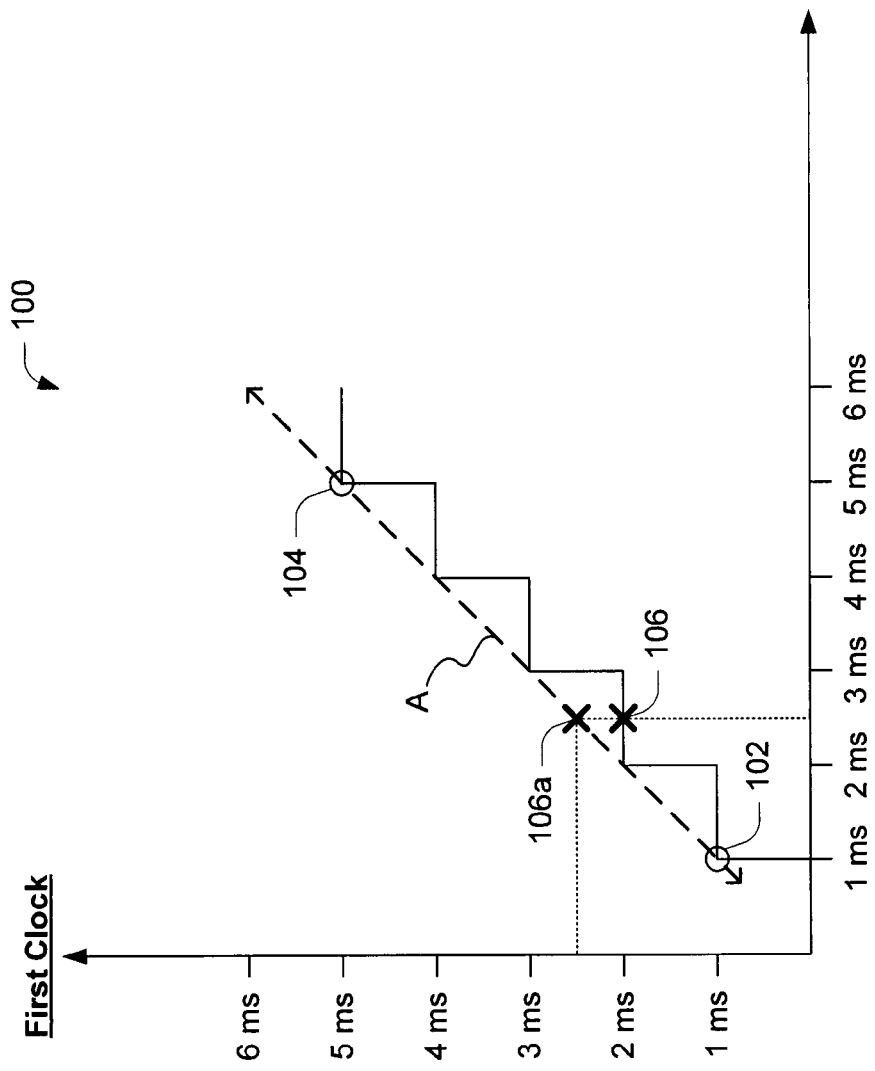
FIG. 1 illustrates a clock having transitions in accordance with one or more embodiments.

As an example, consider FIG. 1. Here, a clock and its transitions are shown generally at 100. Here, the represented clock constitutes the "second" slower clock. Assume in this example that the clock transitions every one millisecond to a different value, thus resulting in the illustrated stair step pattern. Thus, the transitions to the next value are represented by the vertical lines in the stair step pattern.

In the illustrated and described embodiment, a first transition 102 is identified and then timestamped using the first faster clock. Any suitable method of timestamping the first transition can be used. For example, the actual time value of the first faster clock at the transition can be used. Alternately or additionally, an average of time values just before and just after the transition can be used. Regardless, once the first transition 102 has been timestamped, a second transition 104 is identified and then timestamped using the first faster clock. Notice now, that a line A is defined between the two transitions. This line defines time values that are more accurate than the time values defined by the second slower clock. This is because the line takes into account values that occur between transitions in the second slower clock.

For example, consider that processing in a media rendering/capturing device is taking place and currently, the point in processing is illustrated by point 106. This point represents an intra-transition point for which position information may be requested. Using the second slower clock without the benefit of the first faster clock, the time associated with point 106 will be determined to be two milliseconds. This is so even though point 106 lays generally midway between the transitions from two milliseconds to three milliseconds. As will be appreciated by the skilled artisan, using the time associated with this point to be two milliseconds will, necessarily, lead to inaccuracies when position information is calculated.

Yet, when the first faster clock is used to timestamp the transitions as described above, a more accurate time value can be generated by ascertaining which point on line A corresponds to point 106. The point on line A that corresponds to point 106 is illustrated at point 106*a*. Knowing the time value of this point, more accurate position information can be generated.

Figure 2:
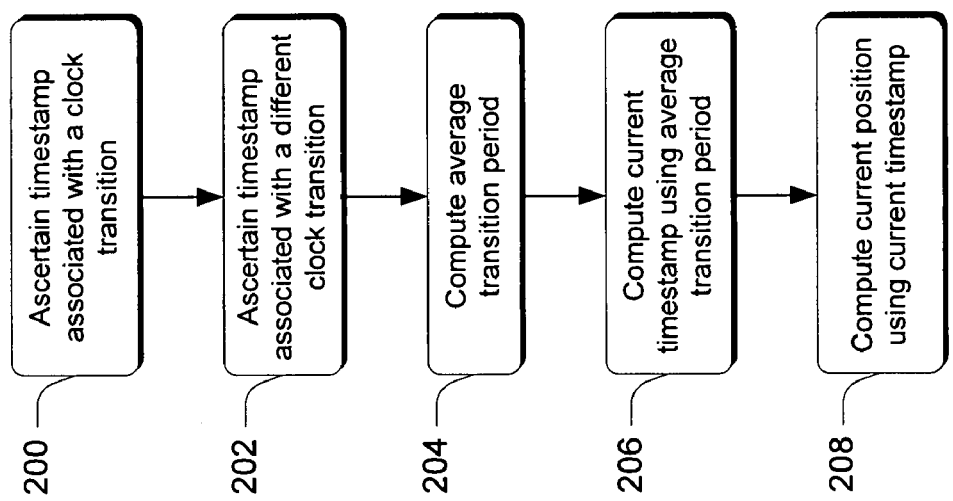
FIG. 2 is a flow diagram that describes steps in a method in accordance with one or more embodiments.

FIG. 2 is a flow diagram that describes steps in a method in accordance with one embodiment. The method can be implemented in connection with any suitable hardware, software, firmware or combination thereof. In one or more embodiments, the method can be implemented by a suitably configured driver in a media rendering device.

Step 200 ascertains a timestamp associated with a clock transition. In one or more embodiments, this step can be performed using a first faster clock to timestamp a transition associated with a second slower clock. Step 202 ascertains a timestamp associated with a different subsequent clock transition. Step 204 computes, from the timestamps, an average transition period. The average transition period represents the average time that it takes to make one transition using the second slower clock.

Step 206 then computes a current timestamp using the average transition period. One example of how this can be done is as follow:

$$TS_{current} = TS_{last} + ((TC_{current} - TC_{TSlast}) * TP_{Average})$$

Where, $TS_{current}$ is the current timestamp, $TS_{last}$ is the last timestamped value, $TC_{current}$ is the current transition count (i.e. how many total transitions have occurred), $TC_{TSlast}$ is the transition count of the last timestamped value, and $TP_{Average}$ is the average transition time period as computed above.

Having computed a current timestamp, step 208 computes a current position information using the current timestamp value. One example of how this can be done is provided below.

In operation, the above-described system utilizes a first faster clock to timestamp transitions in a second slower clock. These timestamped transitions are then used to ascertain an average transition period. By knowing the average transition period, a more accurate current timestamp can be computed which, in turn, can be used to compute more accurate position information than if only the second slower clock were to be used to ascertain timestamp values.

Having described a general example of how timestamping can be performed using a first faster clock, consider now a specific example of how the above-described methodology can be implemented in connection with one embodiment.

Implementation Example

The example about to be described is described in the context of a USB audio device. It is to be appreciated and understood that the methodologies described above and below can be implemented in connection with other systems without departing from the spirit and scope of the claimed subject matter.

In the example about to be described, a first faster clock is used to timestamp transitions in a second slower clock in the context of a USB audio device. In this example, the first faster clock is a system performance counter. Any suitable system performance counter can be used. Generally, performance counters are part of modem microprocessors and measure time in processor "ticks" which are relative to the processor of the machine on which the performance counter is running. The system provides a means of dividing the ticks into larger, more usable measurements of time to be relevant to other clocks. In one implementation, the ticks are converted to 100 nanosecond increments. The second slower clock is the USB SOF counter which, as mentioned above, works at the level of one millisecond increments.

In the discussion that follows, much of the processing that takes place occurs in the USB audio driver. Initially, the USB audio driver looks for an SOF counter transition and timestamps the transition using the performance counter. In at least some embodiments, the driver can do this as soon as it receives the first position request at the beginning of a stream of audio data, as will be appreciated by the skilled artisan. In operation, the first SOF counter transition is timestamped by taking a spinlock and polling its value through an API presented by a USB stack. The driver "spins" continuously polling on that value until it changes from the first poll. At the same time, the driver takes a performance counter reading just before and after every poll. In operation, to limit the amount of time the driver spends at a Deferred Procedure Call (DPC) level, the request to timestamp the transition will fail if a transition cannot be detected within 1.05 milliseconds. The DPC level is a higher priority level thread than almost all others in the system. Thus, much of the other processing is held off until this completes, as will be appreciated by the skilled artisan. If a transition is detected in this time, the timestamp just before and just after as determined by the performance counter readings cannot be more than 0.1 milliseconds. This is done to ensure an accurate timestamp of the transition. The average of these two readings determines the timestamp of the transition.

If both of these conditions cannot be met, the request for the timestamp fails and is retried upon the next position request. Once the first transition is timestamped by this method, the next USB SOF timestamp is computed for a transition that takes place several transitions from the current transition. In one or more embodiments, the next timestamp for the SOF counter is taken 50 SOF counts later (roughly 50 milliseconds). Now, having the two timestamped transitions, the amount of time per cycle relative to the performance counter can be computed. That is, the average time between SOF counter transitions can be computed. At this point, the driver has a fairly accurate measure of the period of the SOF counter.

After the driver has determined the period of the SOF counter, it can use this value to accurately extrapolate the audio position of the data currently being processed by the USB audio device based on the current SOF count and the amount of time since the second timestamped SOF occurred. In one or more embodiments, the calculations can be performed as follows (in this example all timestamps and time per frame are stored in units of 100 ns):

CurrentFrameTimestamp=LastTimestampedSOFtime+
((CurrentSOFCount−LastTimestampedSOF-
Count)*TimePerFrame), CurrentPosition=TotalAlreadyReturnedBytes+
BytesUpToCurrentFrame+
((BytesPerSample*SampleRate)*(CurrentPerf-
CounterTime−CurrentFrameTimestamp)/
(1000*TimePerFrame))

Here, the current frame timestamp is computed by taking the last timestamped SOF time (i.e. the last spin time) and adding to it the product of the time per frame (i.e. the period of the SOF counter) and the difference between the current SOF count and the last timestamped SOF count.

Once the current frame timestamp is ascertained, the current position can be computed using the equation just above. That is, the current position can be computed by taking the sum of the total number of bytes that have already been rendered/captured to/by the device and returned to the driver and the bytes up to the current frame. To this sum is added the product of the bytes per sample and the sample rate, multiplied by the difference between the current performance counter time and the current frame timestamp divided by 1000 times the time (in seconds) per frame as determined by the sample rate.

In the illustrated and described embodiment, after approximately 100 SOFs have passed since the last timestamped SOF, the last timestamped SOF is used as a new starting point, and a new SOF is timestamped to account for changes in the rate of SOFs, as well as to get a better measurement of the time between SOFs. The old value for the TimePerFrame is averaged with the newly calculated value and the new value is then used from that point until the next update.

In the illustrated and described embodiment, if the stream is stopped or there is an error detected on the USB bus, the process re-starts from the beginning with the first timestamped SOF.

Figure 3:
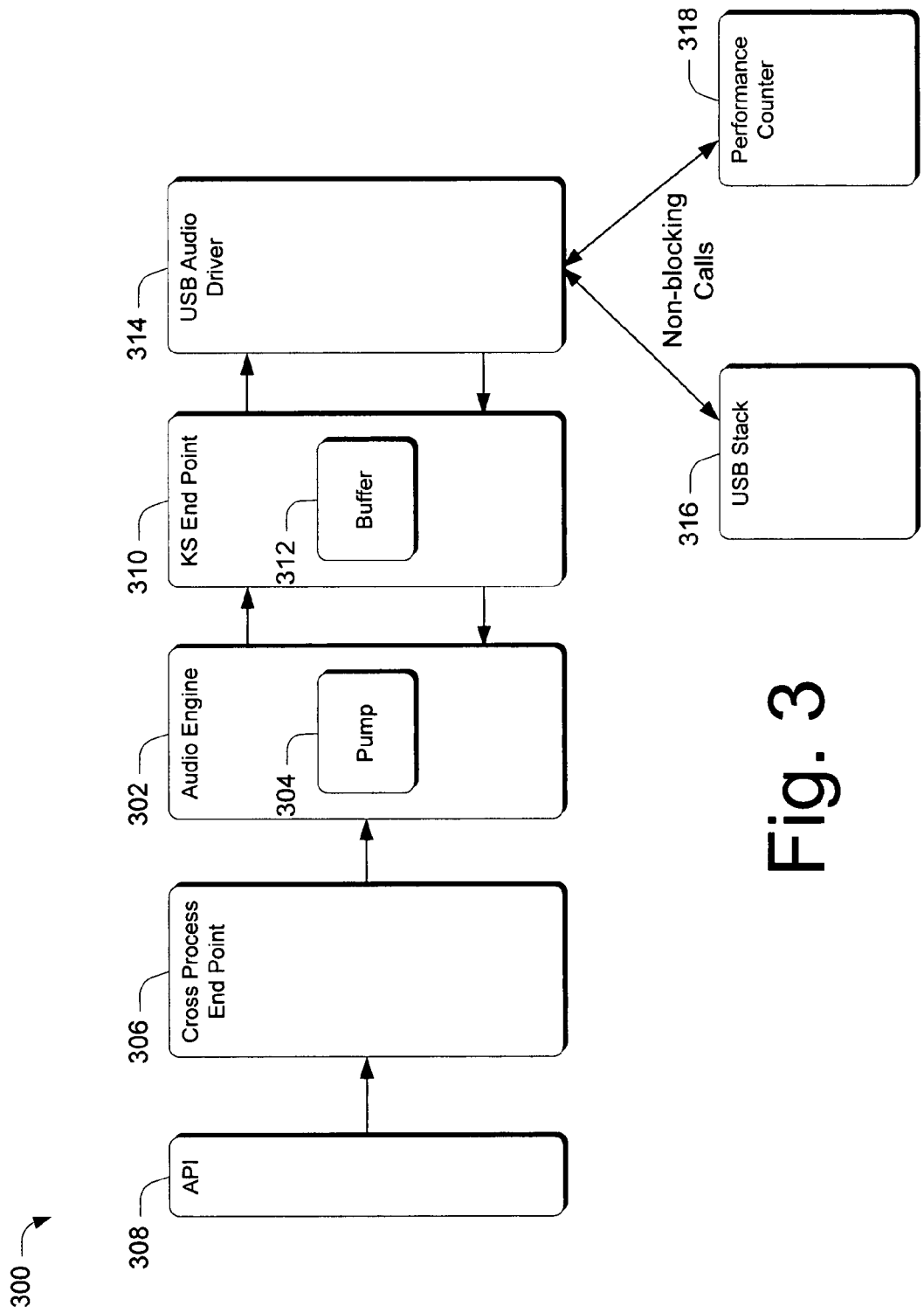
FIG. 3 illustrates a system in accordance with one or more embodiments.

As an example of a system that can implement the above-described processing, consider FIG. 3. There, a system 300 that utilizes a USB audio rendering device and includes an audio engine 302 having an audio pump 304 that pumps audio data through the system. A cross process endpoint 306 receives audio data from an API 308 and passes the audio data into the audio engine 302 for processing at the period of the audio engine clock. A KS (kernel streaming) endpoint 310, which essentially serves as the user mode encapsulation of the driver, takes the audio data from the pump 304, processes it into data buffer 312, packetizes the data and provides the packetized data to the USB audio driver 314.

USB audio driver 314 receives the packetized data and provides it to a USB stack 316. In operation, a non-blocking call is issued from the audio driver 314 to the USB stack 316 to ascertain the SOF counter value. A non-blocking call is one that completes immediately or returns an error. Driver 314 also queries performance counter 318 using a non-blocking call to ascertain the counter value. The driver then uses this information, as described above, to timestamp the SOF and compute position information as described above.

After the USB audio driver computes the new position information, the driver can provide the position information back into the KS endpoint 310 and the audio engine 302 for whatever use is appropriate, e.g. for acoustic echo cancellation and the like.

The above-described processing describes what is known as the rendering path—which is the processing that takes place when the audio data is being rendered. The processing would be much the same for a capture path—which is the processing that takes place when the audio data is being captured and placed into buffer 312.

Example System

Figure 4:
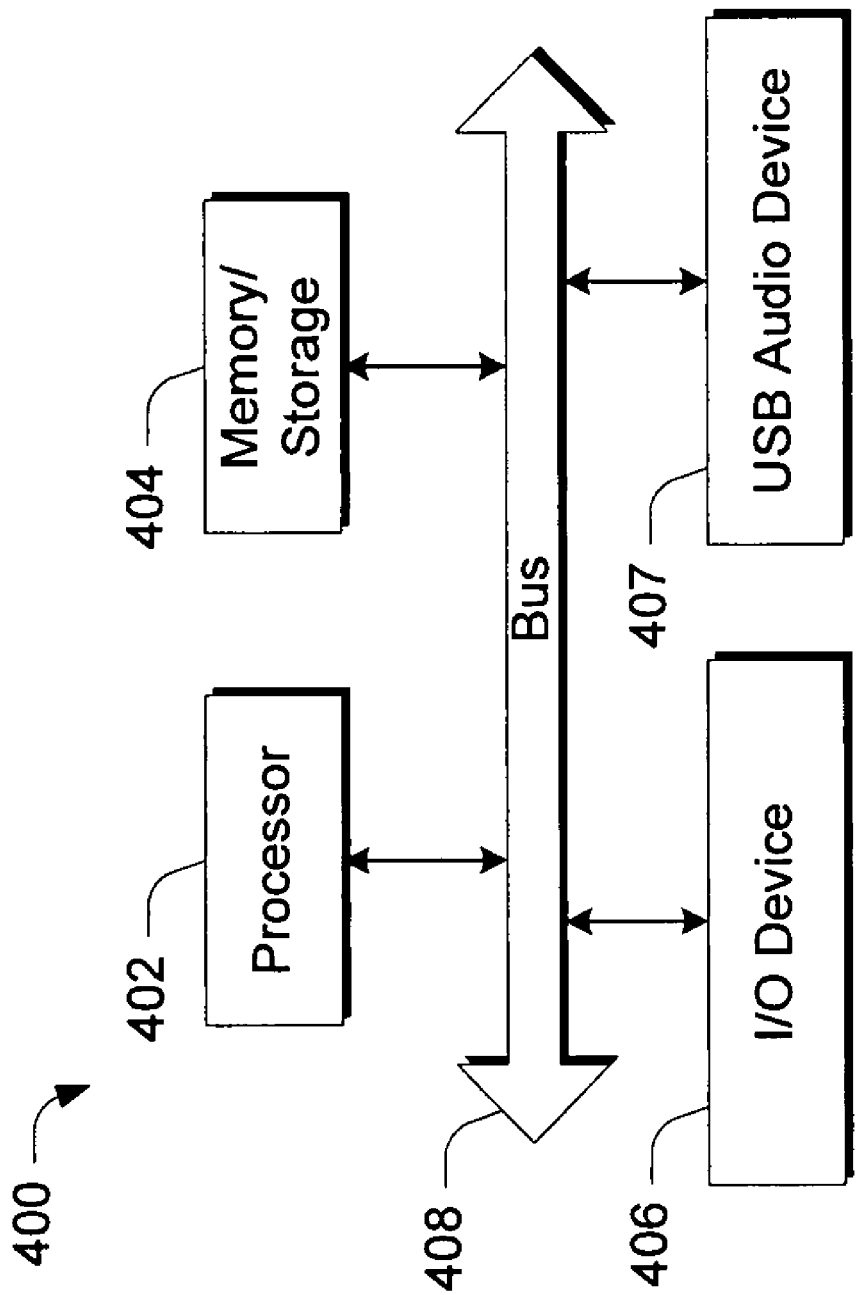
FIG. 4 illustrates an example system that can be utilized to implement one or more embodiments.

FIG. 4 illustrates an example computing device 400 that can implement the various embodiments described above. Computing device 400 can be, for example, any suitable computing device such as a client device and/or server device.

Computing device 400 includes one or more processors or processing units 402, one or more memory and/or storage components 404, one or more input/output (I/O) devices 406, a USB audio device 407 (such as that described above) and a bus 408 that allows the various components and devices to communicate with one another. Bus 408 represents one or more of any of several types of bus structures, including a memory bus or memory controller, a peripheral bus, an accelerated graphics port, and a processor or local bus using any of a variety of bus architectures. Bus 408 can include wired and/or wireless buses. A USB bus would be a separate bus that is connected between a processor bus and USB audio device 407.

Memory/storage component 404 represents one or more computer storage media. Component 404 can include volatile media (such as random access memory (RAM)) and/or non-volatile media (such as read only memory (ROM), Flash memory, optical disks, magnetic disks, and so forth). Component 404 can include fixed media (e.g., RAM, ROM, a fixed hard drive, etc.) as well as removable media (e.g., a Flash memory drive, a removable hard drive, an optical disk, and so forth).

One or more input/output devices 406 allow a user to enter commands and information to computing device 400, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

CONCLUSION

Various embodiments utilize different counters or clocks, working in concert, to smooth out position information that is derived for a rendering/capturing device. Specifically, in at least some embodiments, each counter or clock has a different speed. A faster counter or clock is used to determine intra-transition position offsets relative to a slower counter or clock.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
    using a first faster clock to look for a first transition in a second slower clock;
    timestamping the first transition using the first faster clock;
    using the first faster clock to look for a second transition in the second slower clock;
    timestamping the second transition using the first faster clock;
    computing an average time between transitions for the second slower clock; and
    using said average time to extrapolate position information for media that is being processed by a media rendering/capturing device.

2. The method of claim 1, wherein the rendering/capturing device is an audio rendering/capturing device.

3. The method of claim 1, wherein the rendering/capturing device is a USB audio rendering/capturing device.

4. The method of claim 1, wherein the first faster clock comprises a system performance counter.

5. The method of claim 1, wherein the second slower clock comprises a Universal Serial Bus Start of Frame counter.

6. The method of claim 1, wherein said acts of timestamping comprise, respectively, using an average of first clock time values before and after a particular transition to compute a timestamp.

7. The method of claim 1, wherein the act of using said average time to extrapolate position information comprises:
    computing a current timestamp from said average time; and
    computing a current position using the current timestamp.

8. The method of claim 1, wherein said acts of using, timestamping and computing are performed, at least in part, by a USB audio driver.

9. The method of claim 1 further comprising repeating said acts of using, timestamping and computing to extrapolate additional position information for media that is being processed by the media rendering/capturing device.

10. A computer-implemented method comprising:
    using, in a system, a first faster clock to timestamp transitions in a second slower clock while the system is under spinlock, wherein the second slower clock comprises a USB SOF counter;
    using a spinlock while ascertaining one or more additional transitions in the second slower clock;
    timestamping said one or more additional transitions using the first faster clock;
    computing an average time between transitions for the second slower clock; and
    using said average time to extrapolate position information for USB audio data that is being processed by a USB audio device.

11. The method of claim 10, wherein the first faster clock comprises a system performance counter.

12. The method of claim 10, wherein timestamping transitions comprises timestamping the transitions using an average of timestamp values before and after a poll of the slower clock that identifies a transition while under spinlock.

13. The method of claim 10, wherein said act of using said average time to extrapolate position information comprises:
    computing a current frame timestamp; and
    using the current frame timestamp to compute a current position.

14. The method of claim 13, wherein said act of computing a current frame timestamp is performed as follows:

$$CurrentFrameTimestamp = LastTimestampedSOFtime + ((CurrentSOFCount - LastTimestampedSOFCount) * TimePerFrame),$$

where:
LastTimestampedSOFtime is the last timestamped SOF frame,
CurrentSOFCount is the current SOF count,
LastTimestampedSOFCount is the last timestamped SOF count, and
TimePerFrame is said average time.

15. The method of claim 14, wherein the current position is computed as follows:

$$CurrentPosition = TotalAlreadyReturnedBytes + BytesUpToCurrentFrame + ((BytesPerSample * SampleRate) * (CurrentPerfCounterTime - CurrentFrameTimestamp) / (1000 * TimePerFrame)).$$

16. A system using an USB audio device comprising:
    an audio engine having an audio pump configured to process audio data; and
    a USB audio driver configured to:
        issue non-blocking calls to a USB stack to ascertain SOF counts;
        issue non-blocking calls to a performance counter to ascertain counter values;
        use the SOF counts and performance counter values to timestamp SOF transitions; and
        use the timestamped SOF transitions to extrapolate position information for audio data that is being processed by the audio device.

17. The system of claim 16, wherein the USB audio driver is configured to provide the position information to the audio engine.

18. The system of claim 16, wherein the USB audio driver is configured to look for SOF transitions.

19. The system of claim 16, wherein the USB audio driver is configured to look for USB bus SOF transitions while using a spinlock.

20. The system of claim 16, wherein the USB audio driver timestamps USB bus SOF transitions using an average timestamp value computed from timestamp values before and after a transition.

* * * * *

UNITED STATES PATENT AND TRADEMARK OFFICE
CERTIFICATE OF CORRECTION

| | | |
|---|---|---|
| PATENT NO. | : 7,818,603 B2 | Page 1 of 1 |
| APPLICATION NO. | : 11/729224 | |
| DATED | : October 19, 2010 | |
| INVENTOR(S) | : Daniel "D. J." Sisolak et al. | |

It is certified that error appears in the above-identified patent and that said Letters Patent is hereby corrected as shown below:

In column 8, line 36, in Claim 15, delete "RetumedBytes+" and insert
-- ReturnedBytes+ --, therefor.

Signed and Sealed this
Eighth Day of February, 2011

David J. Kappos
*Director of the United States Patent and Trademark Office*